United States Patent [19]

Lang et al.

[11] Patent Number: 5,722,629
[45] Date of Patent: Mar. 3, 1998

[54] MOUNTING FOR AN EXTERNAL REAR VIEW MIRROR OF COMMERCIAL VEHICLES

[75] Inventors: Heinrich Lang, Ergersheim; Wolfgang Seiboth, Bad Windsheim; Herbert Riegel, Flachslanden, all of Germany

[73] Assignee: Mekra Rangau Plastics GmbH & Co. KG, Germany

[21] Appl. No.: 510,742

[22] Filed: Aug. 3, 1995

[30] Foreign Application Priority Data

Aug. 20, 1994 [DE] Germany ............... 44 29 603.7

[51] Int. Cl.⁶ ............................................ A47G 1/24
[52] U.S. Cl. ................................. 248/479; 359/841
[58] Field of Search ........................... 248/479, 480, 248/485, 486, 487, 476, 477, 478; 359/841, 872, 874, 876, 871

[56] References Cited

U.S. PATENT DOCUMENTS 5,081,546  1/1992  Bottrill .................. 248/478 X
5,210,651  5/1993  Shibuya et al. ......... 248/487 X

FOREIGN PATENT DOCUMENTS 0449080  3/1991  European Pat. Off. .
0527455  8/1992  European Pat. Off. .
980585   1/1965  United Kingdom .

Primary Examiner—Ramon O. Ramirez
Attorney, Agent, or Firm—Laff, Whitesel, Conte & Saret, Ltd.

[57] ABSTRACT

A mounting for an external rear-view mirror of a commercial vehicle comprises a tubular arm, which is supported on a metal bracket to be joined to the commercial vehicle for pivoting about a pivot axis and for snap-in locking in various pivoting positions. The end, close to the vehicle, of the arm is inserted directly as a pivoting pin in a pivot bearing opening of the bracket, a bearing bush being placed in between for the formation of a plastics-metal bearing combination, and the bearing bush having an annular projection, which is provided with locking teeth meshing with mating teeth on the bearing bush.

11 Claims, 5 Drawing Sheets

MOUNTING FOR AN EXTERNAL REAR VIEW MIRROR OF COMMERCIAL VEHICLES

BACKGROUND OF THE INVENTION

1. Field of the Invention

The invention relates to a mounting for an external rear-view mirror of a commercial vehicle, comprising a tubular arm, of which the end remote from the vehicle is provided with a mirror, and of which the end close to the vehicle is supported on a metal bracket to be joined to the commercial vehicle, for pivoting about a pivot axis and for snap-in locking in various pivoting positions.

2. Background Art

A mounting of the generic type for commercial vehicles is known for instance from EP 0 449 080 B1, EP 0 527 455 A1 or from British patent 980 585. These mountings have in common that the arm made of metal or pivoting pins in the form of metal bolts joined to the arm are pivotally lodged in a metal bracket. Consequently, these mountings feature a metal-metal bearing combination, which has several disadvantages in everyday use. For instance, contact corrosion may occur where the bracket and the arm or the latter's pivot pin are in touch, rendering the pivoting adjustment of the arm difficult or even impossible. Moreover, as a result of the contact corrosion, there is a considerable risk that the stability of the arm is impaired. In the least favorable case, this may result in the arm breaking off.

Further, it has become apparent that owing to the high dynamic stresses to which the mirror mounting is exposed for instance by vibrations, metal-metal combined bearings strongly tend to wear out, and that in particular the tubular arm is subject to high wear in the vicinity of its bearing in the bracket on the side of vehicle. There is the risk that external rear-view mirrors fixed to commercial vehicles by conventional mountings will start to dangle.

The prior art mountings are very complicated constructionally, as a result of which they are difficult to mount and expensive to manufacture.

SUMMARY OF THE INVENTION

It is accordingly the object of the invention to embody a mounting for an external rear-view mirror of the type mentioned at the outset such that problems of corrosion are avoided and the installing requirements are considerably reduced.

This object is solved in that the end, close to the vehicle, of the arm is directly inserted as a pivoting pin into a pivot bearing opening of the bracket, a bearing bush of plastic material non-rotatably joined to the arm being disposed between the pivot bearing opening and the arm, forming a pivot bearing that features a plastics-metal bearing combination between the arm and the bracket, the bearing bush further comprising an annular projection provided with locking teeth on one of its axially extending flanks, the locking teeth detachably meshing with mating teeth on the bracket.

The bearing bush of plastic material provided accordingly helps create a bearing featuring a plastics-metal bearing combination, in which the corrosion problems mentioned at the outset are principally avoided. Owing to the annular projection provided with locking teeth and disposed on the bearing bush, the latter fulfills a double function in that it provides simultaneously for the arm to be arrested in various positions of pivoting. In this regard, the number of components necessary for the mounting according to the invention can be reduced as compared with the prior art, which leads to the projected simplification of installation and reduction of manufacturing costs. It is not least the appropriate selection of the plastic material for the bearing bush—for instance polyamide may be used—that will make the bearing extremely resistant to wear so that problems of wear mentioned at the outset are counteracted.

Further features, details and advantages of the invention will become apparent from the subclaims and the ensuing description of exemplary embodiments, taken in conjunction with the drawings.

DESCRIPTION OF THE PREFERRED EMBODIMENTS

Figure 1:
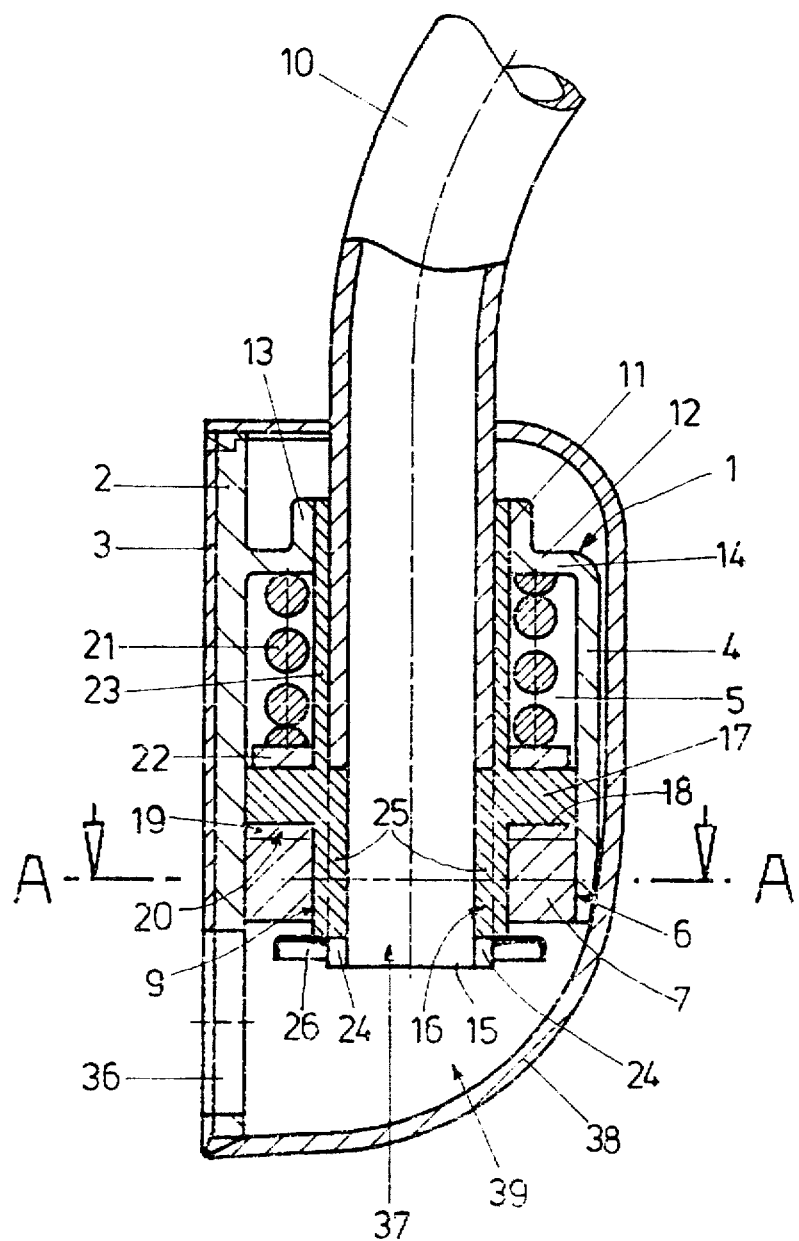
FIG. 1 is a vertical section of a first embodiment of a mirror mounting.
Figure 2:
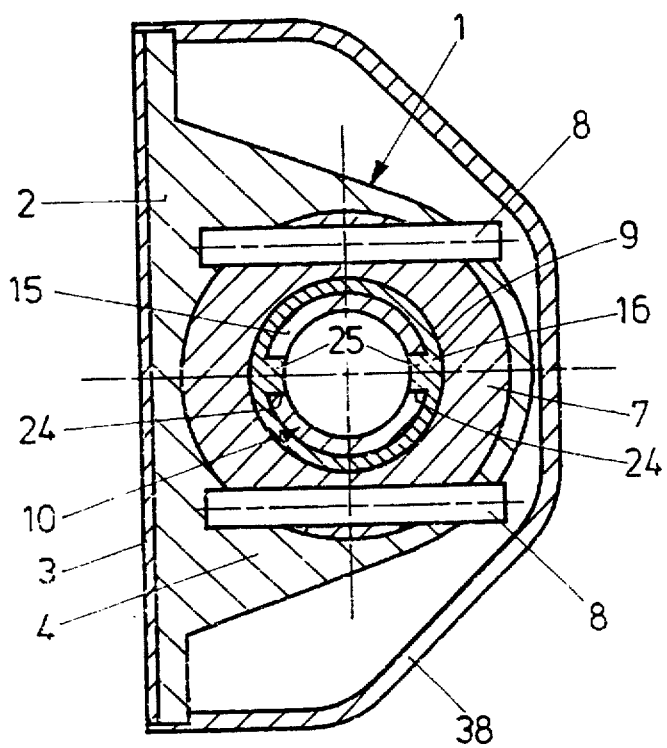
FIG. 2 is a horizontal section on the line A—A of FIG. 1.

In the embodiment according to FIGS. 1 and 2, the entire bracket, made of aluminum, of the mirror mounting has the reference numeral 1. It comprises a substantially rectangular base plate 2 to be screwed in a manner not shown in detail on the windscreen pillar of the driver's cabin of a commercial vehicle, with a thin slightly flexible plate 3 of plastics being placed in between.

A nose-type bearing body 4 of the bracket 1 is integrally formed on, and projects over, the side of the base plate 2 turned away from the plate 3, inside having a cylindrical receptacle 5 open to the bottom. In the resulting lower opening 6 of the receptacle 5, a bearing ring 7 of aluminum is inserted, which—as seen in FIG. 2—is arrested in the bearing body 4 by means of two parallel pins 8 passing horizontally through the bearing body 4 and the bearing ring 7. The bearing ring 7 forms a first pivot bearing opening 9 for the tubular arm, as a whole marked by the reference 10, of the external rear-view mirror. A second pivot bearing opening 11 is provided in the upper side 12 of the bearing body coaxially with the pivot bearing opening 9. This pivot bearing opening 11 is formed by an annular collar 13, which projects over the outside of an annular shoulder 14 on the upper side 12 of the bearing body 4.

As further seen in FIG. 1, the end 15, close to the vehicle, of the arm 10 is directly inserted as a pivoting pin in the two pivot bearing openings 9, 11, a bearing bush 16 being provided in the pivot bearing opening 9 between the inside of the bearing ring 7 and the outside of the tubular arm 10. This bearing bush 16 consists of polyamide plastics, consequently forming a bearing featuring a pink, plastics-metal bearing combination between the arm 10 and the pivot bearing opening 9.

On the outside the bearing bush 16 is further provided with an annular projection 17 for accommodation in the receptacle 5 before the bearing ring 7 in the example of embodiment of FIGS. 1 and 2. The lower flank 18, extending in the axial direction, of the annular projection 17 is provided with locking teeth 19, which mesh with mating teeth 20 on the inside, facing the teeth 19, of the bearing ring 7 of the bracket 1. The locking engagement is secured by a helical compression spring 21, which is inserted in the receptacle 5 between the annular shoulder 14 and the annular projection 17, with an annular disk 22 placed in between on the side of the annular projection 17.

On the side turned away from the annular ring 7, the bearing bush 16 is provided with an integrally formed sleeve-type extension piece 23, which extends along the arm 10 as far as into the second pivot bearing opening 11. The pivot bearing opening 11 combines with the arm 10 and the extension piece 23 to form, between the arm 10 and the bracket 1 a second pivot bearing, which is disposed in the axial direction at a distance from the first pivot bearing formed by the pivot bearing opening 9, and which is likewise a plastics-metal bearing combination.

As seen from a combination of FIGS. 1 and 2, the bearing bush 16 comprising the annular projection 17 and the extension piece 23 is slipped on the arm 10 from the latter's end 15 close to the vehicle, the wall of the end 15, remote from the vehicle, of the arm 10 having two axially parallel slits 24 as arresting apertures, with which a longitudinal web 25 on the inside of the bearing bush 16 engages as a locking projection. As a result, the bearing bush 16 and the annular projection 17 and the extension piece 23 alike are arrested in relation to the arm 10 in the direction of rotation. Additionally, the bearing bush 16 is safeguarded against being pulled off the arm 10 by a spring washer 26 slipped on the end 15, close to the vehicle, of the arm 10.

In short, the details of assembling the mounting according to FIGS. 1 and 2 consist in that the helical compression spring 21, the annular disk 22, the bearing bush 16 and the bearing ring 7 of the configuration seen in FIG. 1 are inserted in the receptacle 5 of the bracket 1 and forced in against the action of the helical compression spring 21. In this position, the bearing ring 7 is arrested by the pins 8. Then the end 15, close to the vehicle, of the arm 10 is slipped into the bearing bush 16 from above, the longitudinal webs 25 on the bearing bush 16 being forced into the slits 24 in the tubular arm 10, and the bearing bush 16 thus being united with the latter safeguarded against rotation.

The functioning of the mounting according to FIGS. 1 and 2 can be specified in short as follows: when the arm 10 is pivoted—for instance for the mirror to be folded down in the case of cramped road conditions—the locking teeth 19 on the bearing bush 16 slide over the mating teeth 20 on the bearing ring 7, the aggregate consisting of the arm 10, the bearing bush 16 and the annular disk 22 yielding upwardly against the spring pressure of the helical compression spring 21. Thus the arm 10 can snap into various positions of pivoting.

The embodiment of FIGS. 3 to 5 again has a bracket 1' with a base plate 2' and a plate 3', the bracket 1' being structured by analogy to the exemplary embodiment of FIGS. 1 and 2 and attachable to the vehicle. The bearing body 4' is likewise of nose-type shape and has a receptacle 5' with an opening 6' at the bottom.

In the case of the bracket 1', a first pivot bearing opening 9' provided on the upper side 12' of the bearing body 4', through which opening the arm 10' passes with a bearing bush 16' of polyamide plastics being placed in between. The beating bush 16' is provided with an annular projection 17', with which it forms one piece and which comes to rest on the upper side 12' of the bearing body 4'. On its flank facing this upper side 12', the annular projection 17' is provided with locking teeth 19', which mesh with mating teeth 20' disposed in the form of a ring on the upper side 12'. The bearing bush 16' is non-rotatably connected with the arm 10' of the mirror by a driver ring 27, which is welded on the arm 10' above the annular projection 17' (weld 28). In the vicinity of its outer edge 29, the driver ring 27 has four rectangular recesses 30, which are regularly distributed along the circumference and with which axial projections 31 on the upper side of the bearing bush 16' engage, having positive fit. This, the bearing bush 16' is arrested against rotation relative to the arm 10'.

The end 15' of the arm 10', which is close to the vehicle and which passes through the pivot bearing opening 9', extends downwardly beyond the opening 6' of the receptacle 5'. A bearing ring 32 of polyamide plastics is slipped on the end 15', taking its position in the vicinity of the opening 6' of the receptacle 5'. In this position, the bearing ring 32 is secured by a split-pin 33, which lodges in two transverse slits 35 cut tangentially in two opposite portions of the wall 34 of the arm 10'. Between the bearing ring 32 and the annular shoulder 14' on the upper side of the receptacle 5', a helical compression spring 21' is inserted, acting upon the aggregate consisting of the arm 10', driver ring 27, bearing bush 16' and plastic bearing ring 32 in the direction of the locking engagement of the locking teeth 19' with the mating teeth 20' on the bracket 1'.

Figure 3:
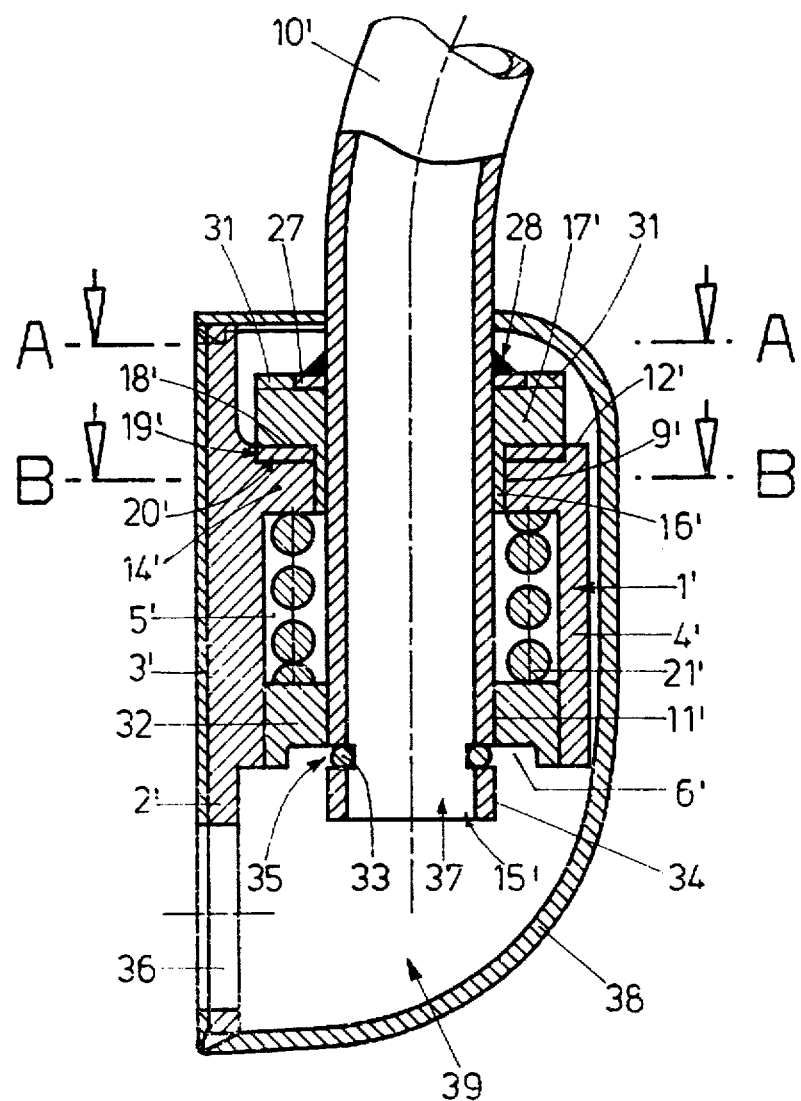
FIG. 3 is a vertical section of a second embodiment of a mirror mounting.
Figure 4:
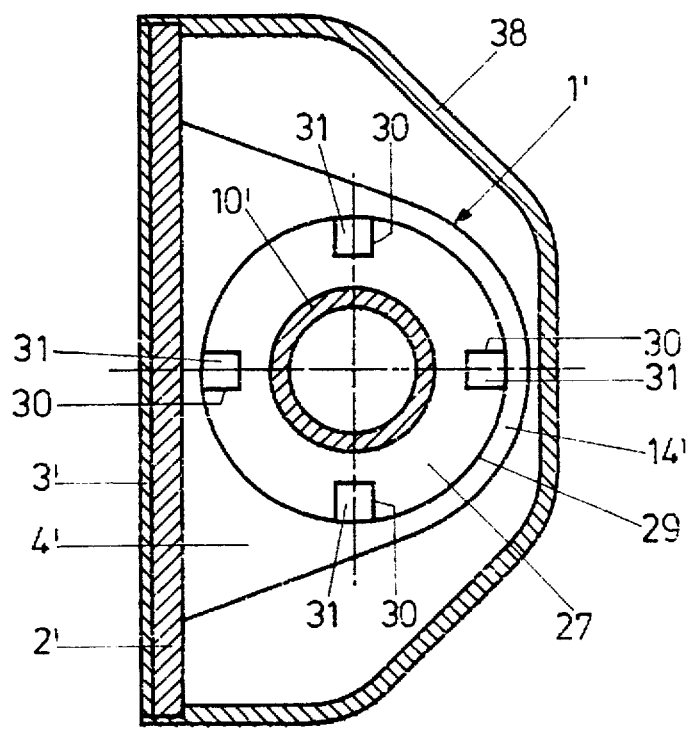
FIGS. 4 and 5 are horizontal sections of the mirror mountings on the lines A—A and B—B, respectively, of FIG. 3.
Figure 5:
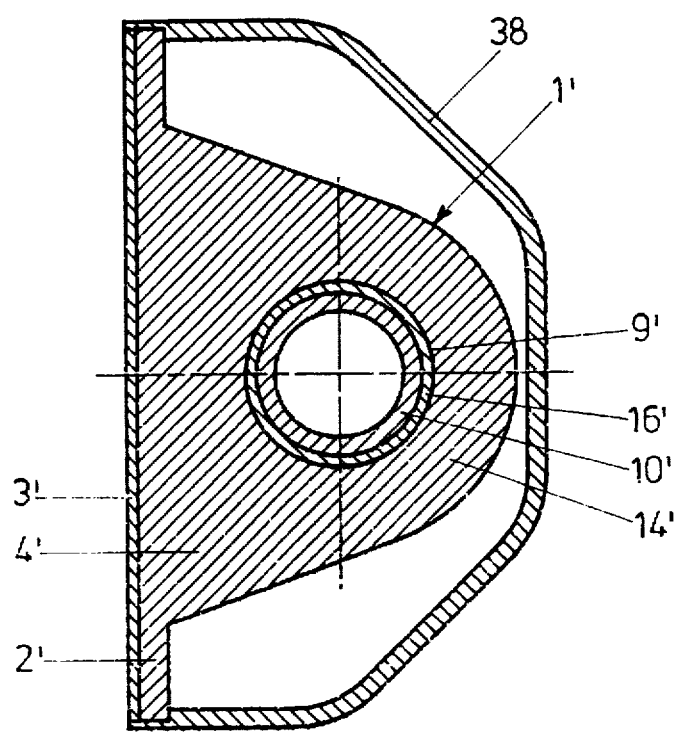

As a result of the specified construction of the mirror mounting according to FIGS. 3 to 5, the arm 10' is provided with a first pivot bearing in the vicinity of the upper pivot bearing opening 9', which is a plastics-metal bearing combination as a result of the bearing bush 16' of polyamide plastics. An axially spaced second pivot bearing is formed by the pivot bearing opening 11' in the bearing ring 32, which is again a plastics-metal bearing combination.

The assembly of the mirror mounting according to FIGS. 3 to 5 is specified in short as follows: the arm 10' with the driver ring 27 welded on it and the bearing bush 16' slipped on it is attached so the bearing body 4' so that the end 15', close to the vehicle, of the arm 10' passes through the pivot bearing opening 9' and the receptacle 5'. Then the helical compression spring 21' is inserted in the receptacle 5' and the bearing ring 32 is forced in against the spring pressure and secured by the split-pin 33. Clearly, here too the assembly is extremely simple.

The functioning of the mirror mounting according to FIGS. 3 to 5 can be specified in short as follows: when the arm 10' is pivoted, again the locking teeth 19' slide over the mating teeth 20', whereby the aggregate consisting of the arm 10', driver ring 27, bearing bush 16' and bearing 32 is moved upwardly against the action by the helical compression spring 21'. As a result it is again possible to arrest the arm 10' in various positions of pivoting.

Both embodiments specified have in common that below the bearing body 4, 4', the base plate 2, 2' is provided with a passage 36, through which to put a cable for the motor-driven adjustment of the mirror disposed on the end, remote from the vehicle, of the arm 10. The cable can be inserted in a very simple way from the passage 36 into the free inside opening 37 of the arm 10, 10'.

Further, the entire bracket 1, 1' together with the end 15, close to the vehicle, of the arm 10 can be closed by a cap 38, which leaves a clearance zone 39 before the passage 35 and the inside opening 37 for the cable to be passed through.

Summing up, it can be said that the subject matter of the invention comprises various advantages:

The arm 10, 10' is protected against contact corrosion and wear by the bearing bushes 16, 16' and the bearing ring 32, respectively.

Even after prolonged use of the mounting, there is no substantial play in the vicinity of the pivot bearings, the plastics-metal bearing combinations steadily adapting to each other.

Owing to the spaced bearings in the vicinity of the pivot bearing openings 9, 11 and 9', 11', respectively, a double support of the arm is ensured which will stably cancel the forces occurring and acting at right angles to the pivot axis.

The assembly is extremely simple, no weldings (FIGS. 1, 2) or, respectively, only a single welding (FIGS. 3–5) being necessary. The number of components is very low so that the subject matter of the invention can be manufactured at a low cost.

The mirror mounting can be disaggregated very easily, which works in favor of environmentally acceptable discarding of the components.

Only very simple working measures are required on the tubular arm, namely the application of the slits 24 and of the transverse slits 35, respectively.

The mirror mounting according to the invention allows a very simple guidance of the cable by way of the passage 36 and the free inside opening 37 of the arm 10.

What is claimed is:

1. A mounting for an external rear-view mirror of a commercial vehicle, comprising a metal bracket (1, 1') to be joined to the commercial vehicle and a tubular arm (10, 10'), of which an end remote from the commercial vehicle is provided with a mirror and of which an end (15, 15') close to the commercial vehicle is supported on the metal bracket (1, 1') for pivoting about a pivot axis and for snap-in locking in various pivoting positions, wherein the end (15, 15'), close to the vehicle, of the arm (10, 10') is directly inserted as a pivoting pin into a pivot bearing opening (9, 9') of the bracket (1, 1'), a bearing bush (16, 16') of plastic material non-rotatably joined to the arm (10, 10') being disposed between the pivot bearing opening (9, 9') and the arm (10, 10'), forming a pivot bearing that features a plastics-metal bearing combination between the arm (10, 10') and the bracket (1, 1'), the bearing bush (16, 16') further comprising an annular projection (17, 17') provided with axially extending flanks (18, 18') and locking teeth (19, 19') on one of its axially extending flanks (18, 18'), the locking teeth (19, 19') detachably meshing with mating teeth (20, 20') on the bracket (1, 1').

2. A mounting according to claim 1, wherein a second pivot bearing (11, 11') axially spaced from the first pivot bearing (9, 9') is provided between the arm (10, 10' and the bracket (1, 1') and is also a plastics-metal bearing combination.

3. A mounting according to claim 2, wherein the plastics-metal bearing combination of the second pivot bearing (11, 11') is formed by an axial extension piece (23) of the bearing bush (16).

4. A mounting according to claim 2, wherein the bearing bush (16) is slipped onto the end (15), close to the vehicle, of the arm (10), having at least one locking projection (25) on its inside for the purpose of being arrested non-rotatably, the locking projection (25) engaging with at least one arresting aperture (24) on the arm (10).

5. A mounting according to claim 4, wherein the at least one arresting aperture is formed by a slit (24) of longitudinal axial extension, which is provided on a wall (34) of the arm (10) and open towards the latter's end, and wherein the locking projection is formed by a longitudinal web (25) engaging with the slit (24).

6. A mounting according to claim 2, wherein the second pivot bearing (11') is formed by a bearing ring (32) of plastic material, which is axially fixed on the end (15'), close to the vehicle, of the arm (10') and which lodges rotatably in an opening (6') of a receptacle (5') of the bracket (1'), which is open towards the end (15'), close to the vehicle, of the arm (10').

7. A mounting according to claim 6, wherein a helical compression spring (21') is inserted in the receptacle (5') between the annular shoulder (14') of the bracket (1') and the bearing ring (32), acting on the aggregate consisting of the arm (10'), a driver ring (27), the bearing bush (16') and the bearing ring (32) in the direction of locking engagement of the locking teeth (19') on the bearing bush (16') with the mating teeth (20') on the bracket (1').

8. A mounting according to claim 1, wherein the arm (10') is provided with a driver ring (27), which is provided with recesses (30) far the purpose of arresting the bearing bush (16') from rotating relative to the arm (10'), axial projections (31) on the bearing bush (16') meshing with the recesses (30).

9. A mounting according to claim 8, wherein the driver ring (27), together with the annular projection (17') of the bearing bush (16'), lodges on such upper side (12') of the bracket (1') as is turned away from the end (15'), close to the vehicle, of the arm (10'), the mating teeth (20) being disposed on this upper side (12'), and the pivot bearing opening (9') of the first pivot bearing being formed by an annular shoulder (14') on the bracket (1') in the vicinity of this upper side (12').

10. A mounting according to claim 1, wherein the bracket (1) has a receptacle (5) open on one side, in an opening (6) of which a bearing ring (7) is fixed, which forms the pivot bearing opening (9), and which on the one hand rotatably supports the bearing bush (16) of the first pivot bearing (9) and on the other hand exhibits the teeth (20) mating the locking teeth (19) on the annular projection (17) of the bearing bush (16).

11. A mounting according to claim 10 wherein between the annular projection (17) of the bearing bush (16) and an annular shoulder (14), a helical compression spring (21) is inserted in the receptacle (5) at the latter's end turned away from the opening (6), acting on the bearing bush (16) in the direction of the locking engagement of the locking teeth (19) with the mating teeth (20).

* * * * *